(12) United States Patent
Tanaka et al.

(10) Patent No.: US 7,603,214 B2
(45) Date of Patent: Oct. 13, 2009

(54) IN-VEHICLE INPUT UNIT

(75) Inventors: Tsuyoshi Tanaka, Kyoto (JP); Yasushi Ishiai, Osaka (JP)

(73) Assignee: Panasonic Corporation, Osaka (JP)

( * ) Notice: Subject to any disclaimer, the term of this patent is extended or adjusted under 35 U.S.C. 154(b) by 587 days.

(21) Appl. No.: 11/432,530

(22) Filed: May 12, 2006

(65) Prior Publication Data
US 2006/0259210 A1    Nov. 16, 2006

(30) Foreign Application Priority Data
May 13, 2005   (JP)  ................ 2005-140917

(51) Int. Cl.
*G05G 1/02* (2006.01)
*G05G 1/08* (2006.01)
(52) U.S. Cl. ........................ 701/36; 307/10.1
(58) Field of Classification Search ........... None
See application file for complete search history.

(56) References Cited
U.S. PATENT DOCUMENTS

| | | | |
|---|---|---|---|
| 6,373,472 B1 * | 4/2002 | Palalau et al. ............... | 345/173 |
| 2005/0021190 A1 * | 1/2005 | Worrell et al. ................ | 701/1 |
| 2005/0073195 A1 * | 4/2005 | Popilek ...................... | 307/10.1 |
| 2006/0227065 A1 * | 10/2006 | Yukawa et al. ............... | 345/7 |
| 2006/0241818 A1 * | 10/2006 | Kumon ........................ | 701/1 |

FOREIGN PATENT DOCUMENTS

| | | | |
|---|---|---|---|
| JP | 05-077679 | * | 3/1993 |
| JP | 11-275189 | * | 10/1999 |
| JP | 2001-10375 | | 1/2001 |
| JP | 2003-175783 | * | 6/2003 |

OTHER PUBLICATIONS

RD361001A, Derwent Abstract, May 10, 1994.*

* cited by examiner

*Primary Examiner*—Michael J. Zanelli
(74) *Attorney, Agent, or Firm*—Wenderoth, Lind & Ponack L.L.P.

(57) ABSTRACT

An in-vehicle input unit is provided which includes: a head-up display which projects a hierarchical menu for operating a plurality of pieces of in-vehicle equipment onto a windshield in front of a driver's seat, and displays the hierarchical menu as a virtual image ahead of the windshield; and a plurality of switches which are disposed in a steering wheel so that several switches adjoin and surround one central switch, in which the head-up display displays selection items on the hierarchical menu as the virtual image so that the selection items correspond one to one to the plurality of switches disposed in the steering wheel.

26 Claims, 13 Drawing Sheets

IN-VEHICLE INPUT UNIT

BACKGROUND OF THE INVENTION

1. Field of the Invention

The present invention relates to an in-vehicle input unit which is capable of operating a hierarchical menu for operating a plurality of pieces of in-vehicle equipment, using switches provided in a steering wheel, while viewing its image displayed by a vehicle display unit.

2. Description of the Background Art

In recent years, an automobile has more and more equipment on board so that safety and comfort can be improved. Specifically, an air conditioner or an audio system is provided as standard equipment, and a car-navigation system has been popular. In the years ahead, equipment related to car communication mainly including telematics, or a driving support device for adaptive cruise control system, lane keeping support system, blind spot monitoring system or the like, spreading from a luxury car to a popular car, is expected to be increasingly popular.

Conventionally, for example, in-vehicle equipment, such as an audio system, an air conditioner and a car-navigation system, which is placed in an automobile center console, needs an input unit such as a switch so that each of them can operate. In addition, each piece of equipment has a high-level function, thus increasing the number of input units such as a switch. Hence, when locating these input units for the in-vehicle equipment, a driver has to turn one's eyes away from the front visibility. This makes it hard for the driver to manipulate the input units. On the other hand, an input unit for an audio function or a driving support device is often provided on the steering wheel so that a comfortable manipulation can be realized. However, a limit is set to the number of switches which can be provided in the steering wheel. Additionally, if many switches are provided on the steering wheel, then similarly to the switching operation for each piece of in-vehicle equipment, a driver would have to turn one's eyes away from the front visibility to locate the switches on the wheel.

The specification of Japanese Patent Laid-Open No. 2001-10375 describes an improved input unit which is capable of operating a plurality of pieces of in-vehicle equipment more safely and comfortably. In this input unit, as shown in FIGS. 12A and 12B, a driver selects in-vehicle equipment, using an operation panel 110 which is provided in a center console 103. Then, while viewing a hierarchical menu displayed in a display 106 which is provided in a visible position to the driver's eyes at the wheel, the driver manipulates an input unit 105 provided in a floor console 104. In addition, as shown in FIGS. 13A to 13D, the array of the hierarchical menu displayed on the display 106 is identical with the key array of the input unit 105. If a driver touches a key, the corresponding part of the hierarchical menu on display is inverted and displayed. Thereby, the driver can execute an operation without looking at the input unit 105 as an operation portion, thus keeping the driving posture unchanged.

In the case where such an input unit is used, in order for a driver to select in-vehicle equipment, the driver at the wheel has to: turn one's eyes away from the front visibility; locate the switch of the equipment which the driver wants to operate in an operation panel provided in a center console; take one hand off of the steering wheel; and execute an input operation while driving the vehicle one-handed. This hinders the driver from driving safely. Further, when handling the switch, the driver stops gazing at a front distant spot outside of the vehicle and turns one's eyes to the switch inside of the vehicle. Thereby, the driver's eyes are focused on a short-distance spot, thus imposing a burden on the eyes. Another disadvantage also arises when the driver operates functions after selecting the equipment. The driver has to: take one hand off of the steering wheel; turn one's eyes away from the front visibility; touch a key in an input unit as an operation portion provided in a floor console; trace the selection state of the hierarchical menu which is inverted and displayed in a display inside of the vehicle; and execute an input operation while gazing at this image. This hinders the driver from driving safely. In addition, when handling the switch, from a front distant spot outside of the vehicle, the driver turns one's eyes on the display inside of the vehicle. Thereby, from the distant spot, the driver's eyes are focused on such a short-distance spot, thus imposing a burden on the eyes.

SUMMARY OF THE INVENTION

It is an object of the present invention to provide an in-vehicle input unit which is capable of checking the contents of a switch and operating the switch, without hindering a driver from driving safely and without imposing a heavy burden on the driver's eyes.

An in-vehicle input unit according to an aspect of the present invention comprises: a head-up display which projects a hierarchical menu for operating a plurality of pieces of in-vehicle equipment onto a windshield in front of a driver's seat, and displays the hierarchical menu as a virtual image ahead of the windshield; and a plurality of switches which are disposed in a steering wheel so that several switches adjoin and surround one central switch, wherein the head-up display displays selection items on the hierarchical menu as the virtual image so that the selection items correspond one to one to the plurality of switches disposed in the steering wheel.

According to this configuration, an input system is designed so that using a head-up display, while viewing a virtual image displayed ahead of a windshield in front of a driver's seat, the driver manipulates switches disposed in a steering wheel. Therefore, the driver can operate the switches without letting go of the steering wheel and without turning one's eyes away from the front visibility. Furthermore, the arrangement of the plurality of switches disposed in the steering wheel corresponds one to one to the arrangement of selection items on a hierarchical menu of the displayed virtual image. Then, the plurality of switches are disposed so that several switches adjoin and surround one central switch, and this single central switch lies in the position where the fingers of an operator are always laid. Therefore, without turning one's eyes to the plurality of switches while viewing the image displayed ahead of the driver's seat, the driver can easily operate the switches intuitively with respect to the position of the central switch. This helps the driver run the vehicle more safely. Moreover, without turning the eyes on the switches from ahead of the driver's seat, the driver can manipulate the switches. This makes it possible to reduce the change in the focal point of the driver's eyes when operating the switches, so that the driver can operate the switches without imposing a heavy burden on the eyes.

These and other objects, features and advantages of the present invention will become more apparent upon reading of the following detailed description along with the accompanied drawings.

DETAILED DESCRIPTION OF THE INVENTION

First Embodiment

Hereinafter, the present invention will be described using its first embodiment.

Figure 1:
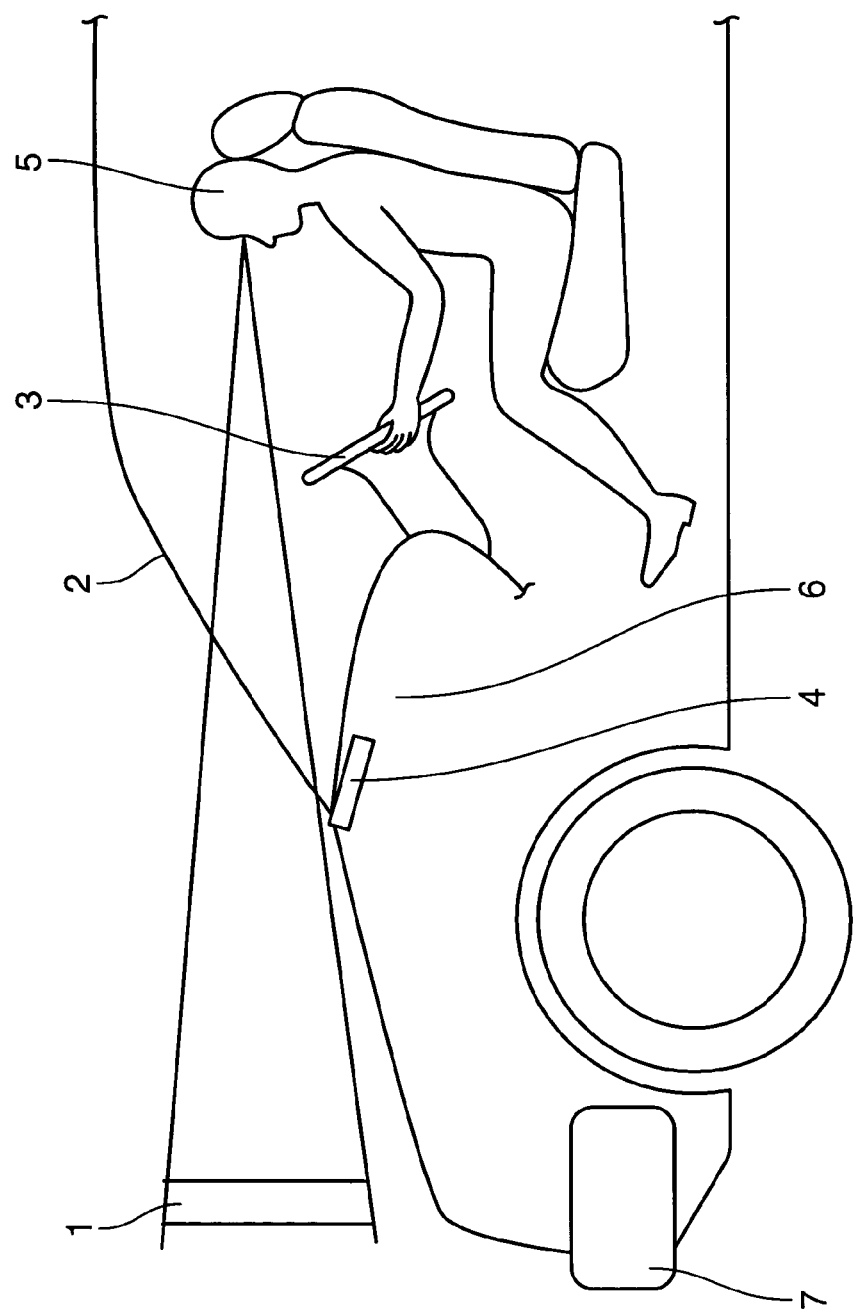
FIG. 1 is a side view of a vehicle and an in-vehicle input unit according to a first embodiment of the present invention, showing its arrangement.
Figure 2:
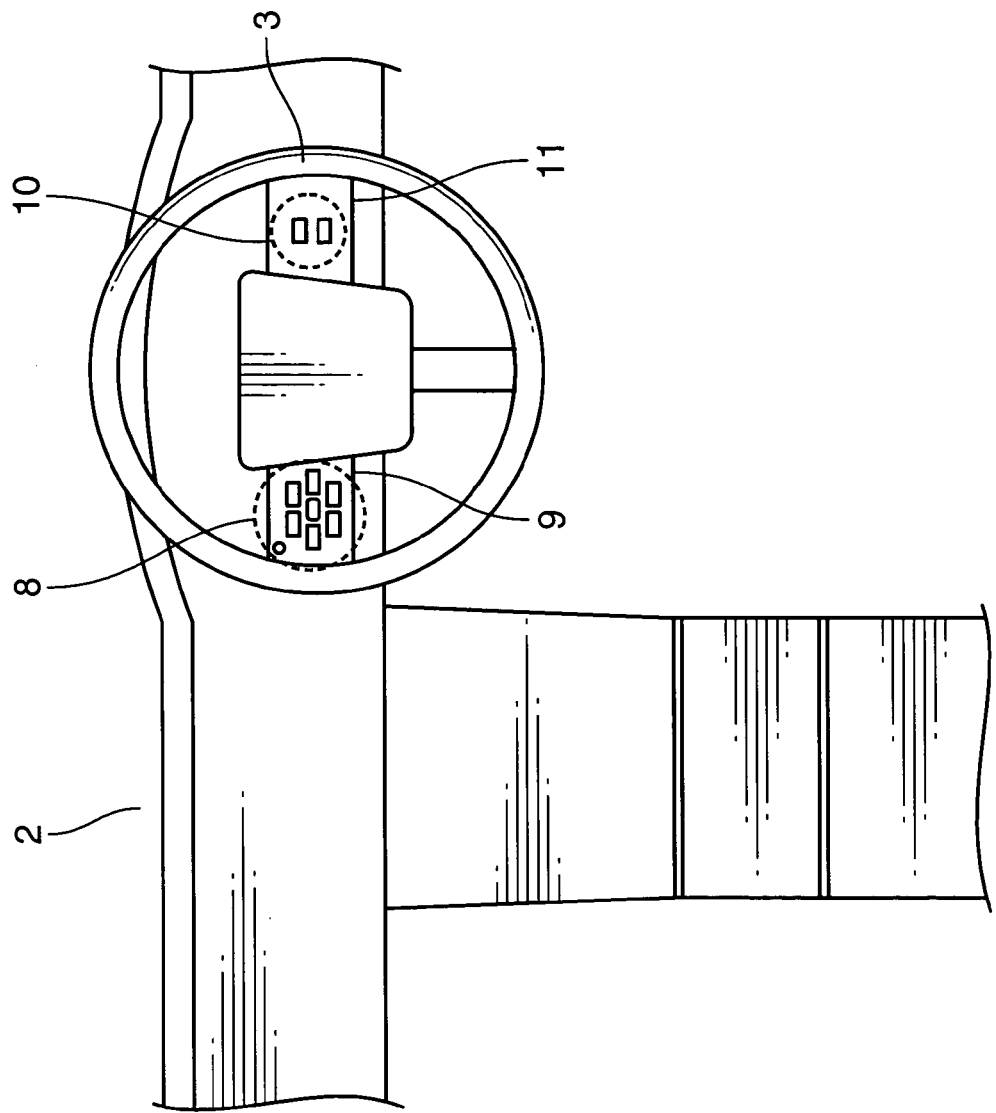
FIG. 2 is a front view of the in-vehicle input unit according to the first embodiment of the present invention, showing its arrangement as seen from a driver's seat.
Figure 3:
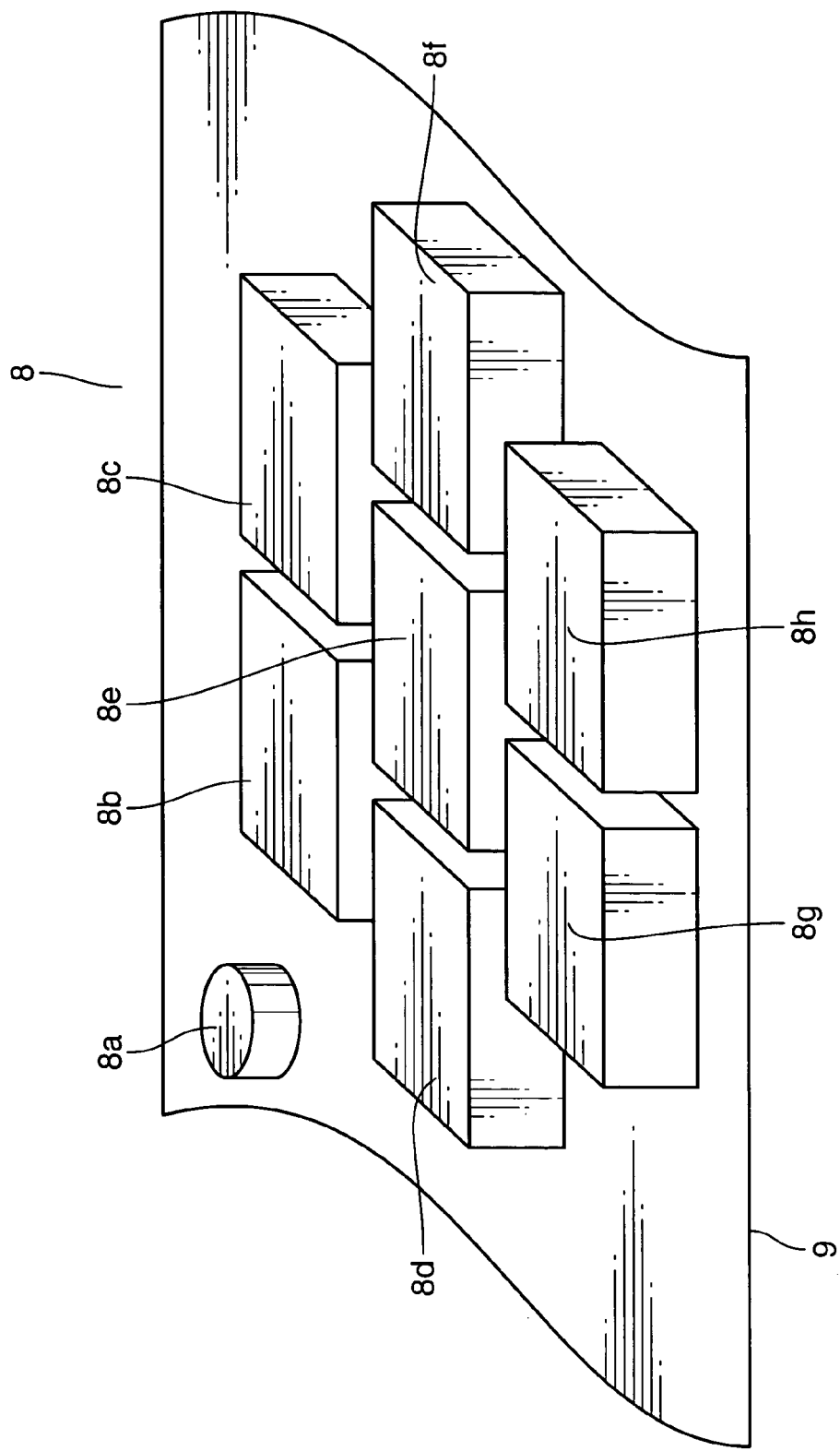
FIG. 3 is an enlarged perspective view of a switch portion provided in a steering spoke on the left side as seen from the driver's seat according to the first embodiment of the present invention.
Figure 4:
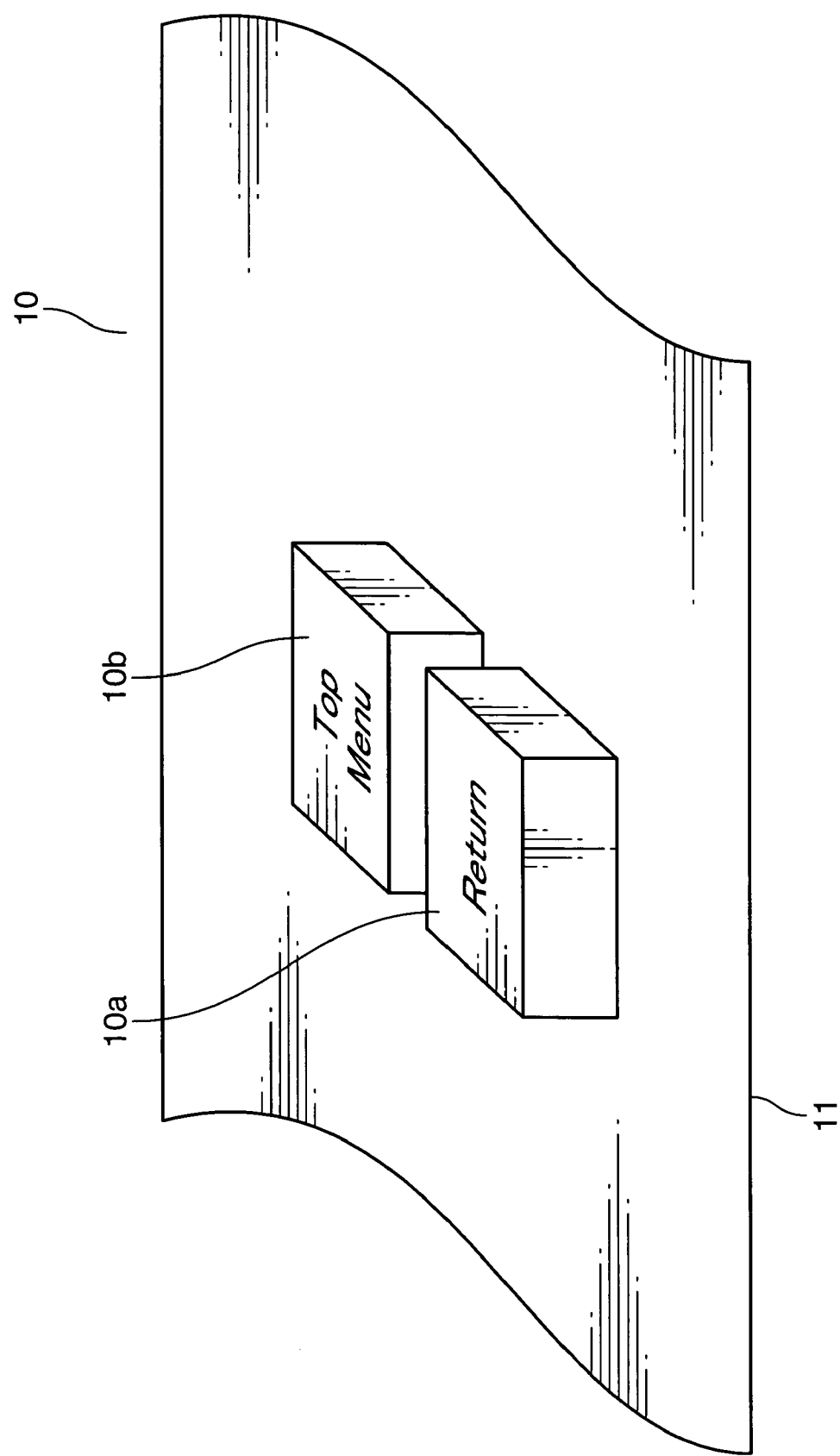
FIG. 4 is an enlarged perspective view of a switch portion provided in a steering spoke on the right side as seen from the driver's seat according to the first embodiment of the present invention.
Figure 5:
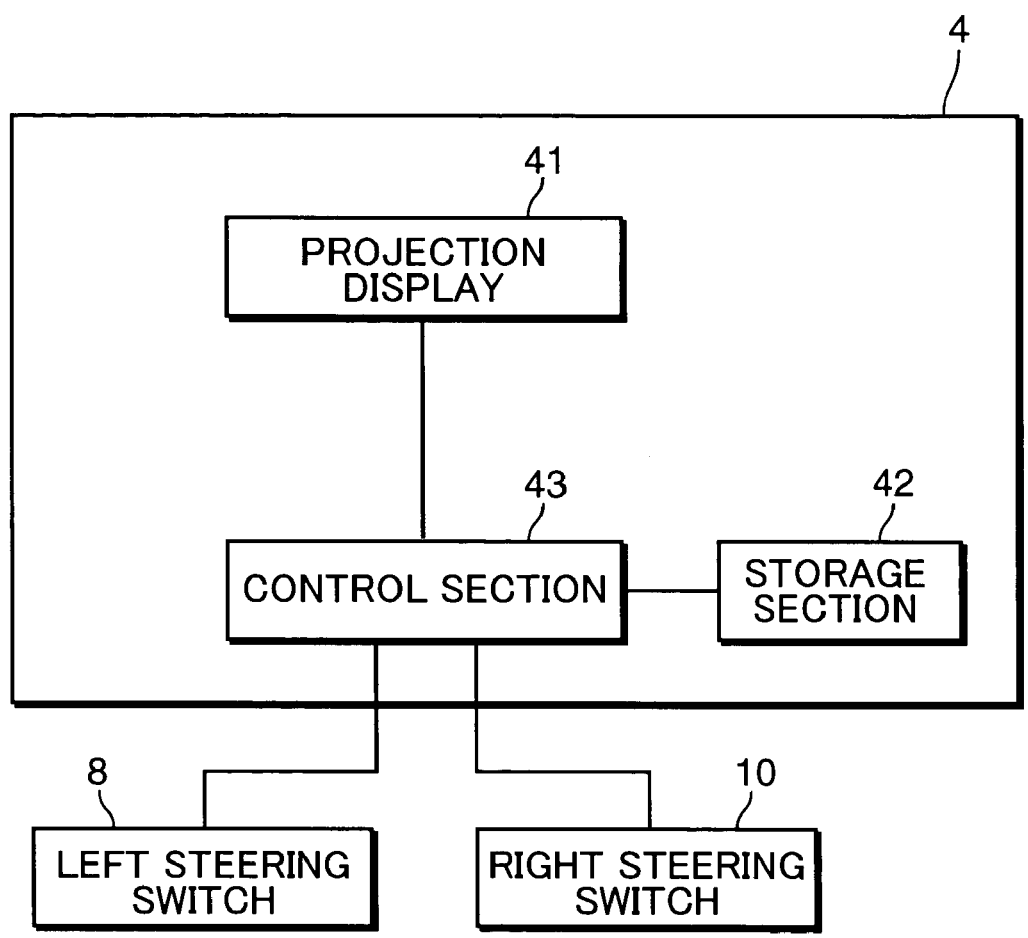
FIG. 5 is a block diagram, showing an example of the electrical configuration of the in-vehicle input unit according to the first embodiment of the present invention.
Figure 6:
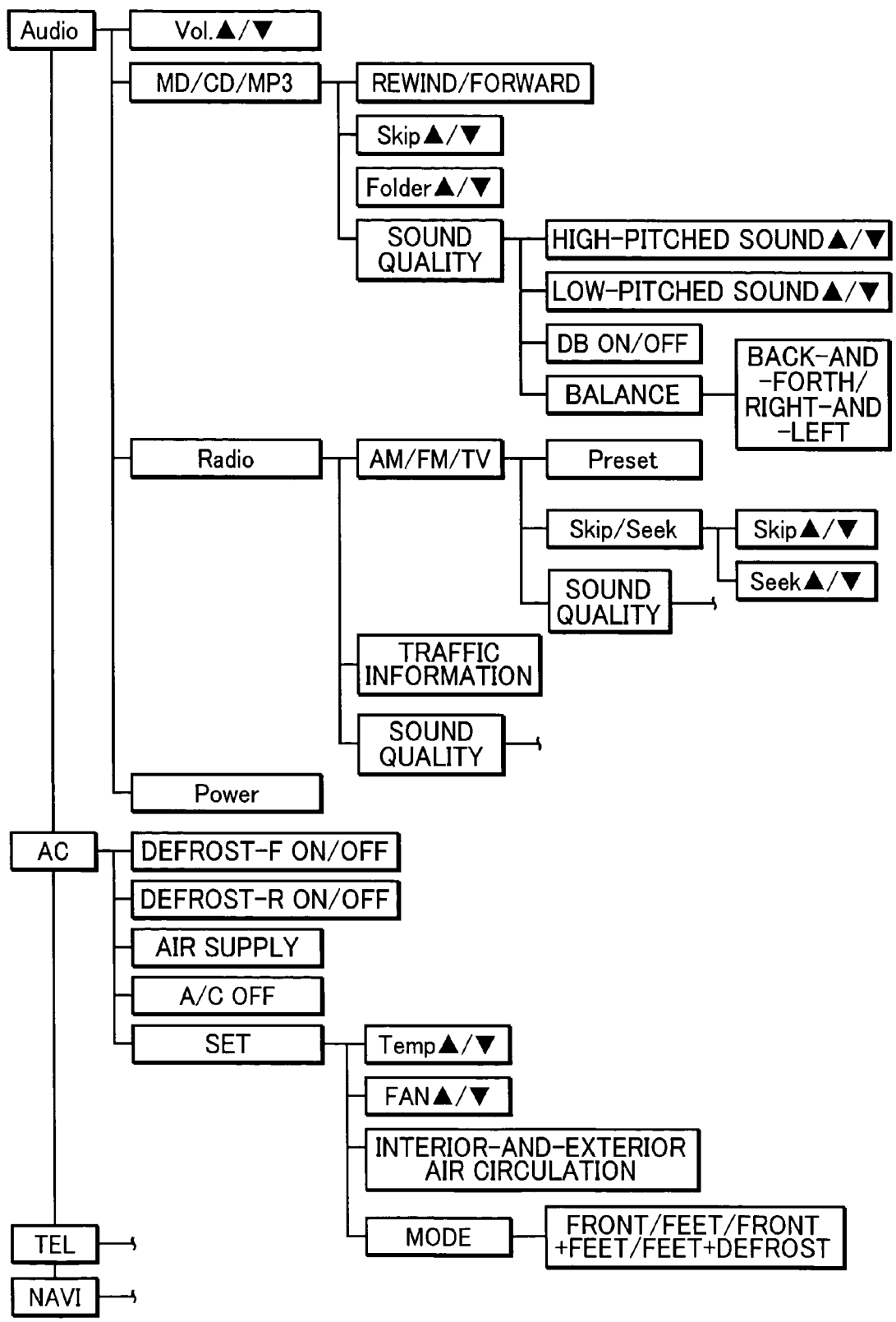
FIG. 6 is a diagram, showing an example of the configuration of a hierarchical menu according to the first embodiment of the present invention.
Figure 8A:
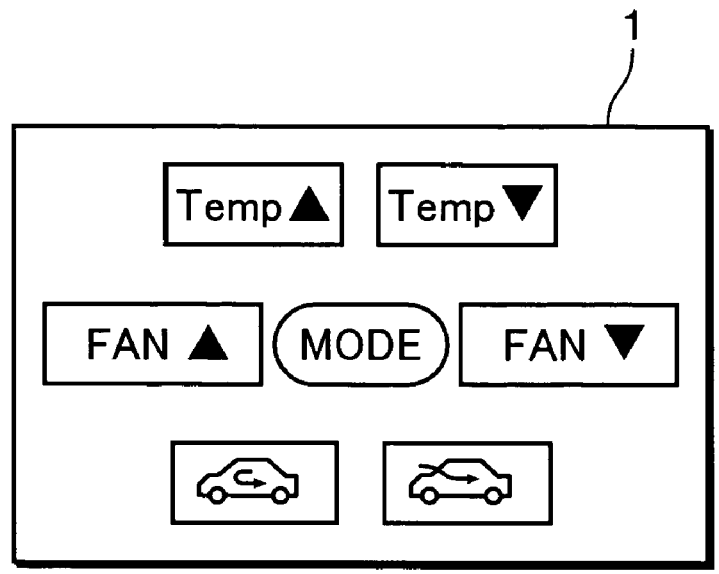
FIGS. 8A and 8B are diagrams, showing an example of the image of a hierarchical menu for an air conditioner according to the first embodiment of the present invention.
Figure 8B:
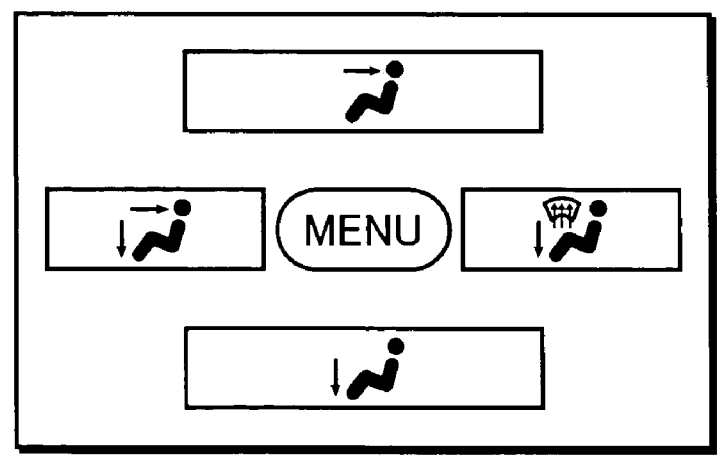
Figure 9:
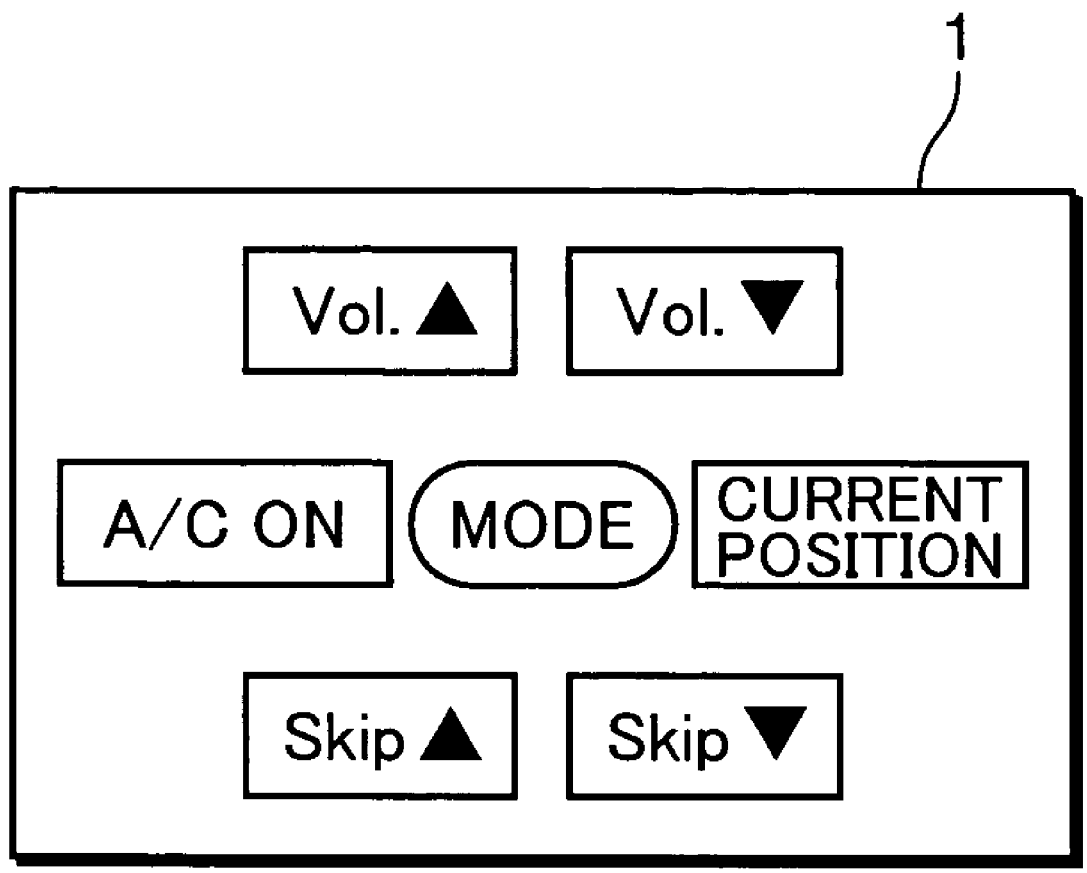
FIG. 9 is a diagram, showing an example of the image displayed when pressing a changing switch provided in the steering spoke on the left side if seen from the driver's seat according to the first embodiment of the present invention.

FIG. 1 is a side view showing the arrangement of a vehicle and an in-vehicle input unit according to the first embodiment of the present invention. FIG. 2 is a front view showing the arrangement as seen from the driver's seat of the in-vehicle input unit according to the first embodiment of the present invention. FIG. 3 is an enlarged perspective view of a switch portion provided in a steering spoke (i.e., the spoke) on the left side as seen from the driver's seat according to the first embodiment of the present invention. FIG. 4 is an enlarged perspective view of a switch portion provided in a steering spoke on the right side as seen from the driver's seat according to the first embodiment of the present invention. FIG. 5 is a block diagram, showing an example of the electrical configuration of the in-vehicle input unit according to the first embodiment of the present invention. FIG. 6 is a diagram, showing an example of the configuration of a hierarchical menu according to the first embodiment of the present invention. FIG. 7A to FIG. 7E are each a diagram, showing an example of the image of the hierarchical menu according to the first embodiment of the present invention. FIG. 8A and FIG. 8B are each a diagram, showing an example of the image of a hierarchical menu for an air conditioner according to the first embodiment of the present invention. FIG. 9 is a diagram, showing an example of the image (i.e., the default operation menu) displayed when pressing a changing switch provided in the steering spoke on the left side as seen from the driver's seat according to the first embodiment of the present invention.

In FIG. 1 and FIG. 2, an input unit which operates a plurality of pieces of in-vehicle equipment, such as an audio system, an air conditioner, a telephone and a car-navigation system, is configured by a left steering switch 8 and a right steering switch 10 which are provided in a steering wheel 3, and a head-up display 4. If a driver 5 operates the left steering switch 8 or the right steering switch 10 provided in the steering wheel 3, then the head-up display 4 disposed inside of an interior dashboard 6 projects, onto a windshield 2, a hierarchical menu for operating the plurality of pieces of in-vehicle equipment. The driver 5 can see a virtual display image 1 which is formed above a front bumper 7 within the front field of vision. While viewing this virtual display image 1, the driver 5 manipulates the left steering switch 8 or the right steering switch 10 disposed in the steering wheel 3. In this input unit, while keeping the driving posture unchanged and holding the steering wheel 3 in both hands, the driver 5 can operate it while viewing the virtual display image 1 displayed in the front visual field. Therefore, the driver 5 can run a vehicle without looking aside inattentively, such as looking at the in-vehicle equipment disposed inside of the vehicle.

In FIG. 3 and FIG. 4, input switches for operating the plurality of pieces of in-vehicle equipment are the left steering switch 8 and a changing switch 8a which are provided in a left steering spoke 9, and the right steering switch 10 disposed in a right steering spoke 11. The left steering switch 8 is configured so that a switch 8b, a switch 8c, a switch 8d, a switch 8f, a switch 8g, a switch 8h adjoin and surround a central switch 8e. In a position apart from this left steering switch 8, the changing switch 8a is disposed.

The changing switch 8a has a different shape from the plurality of switches 8b to 8h. As shown in FIG. 3, for example, the changing switch 8a is columnar, and the several switches 8b to 8h are each shaped like a rectangular parallelepiped.

As long as the left steering switch 8 is disposed so that several switches adjoin and surround the central switch 8e, they may also be located up-and-down or right-and-left with respect to the central switch 8e. Or, they can also be disposed up-and-down or right-and-left, obliquely in either case.

In this way, if the several switches adjoin and surround the central switch 8e, the driver 5's finger which operates the central switch 8e is put in position. When operating any of the other several switches around it, the driver 5 can move the finger from this fixed position to the targeted switch, through a simple up-and-down, right-and-left, or slant motion. In addition, the driver 5 can operate the targeted switch without looking at it, with keeping the eyes within the front field of vision. This makes it possible to restrain a heavy burden from being imposed on the eyes.

In the right steering switch 10, two switches 10a, 10b are provided up and down. The switch 10a (i.e., the return switch) is a switch for returning to the display image which was operated one frame ahead, for example, the virtual image which indicates the higher layer on the hierarchical menu. The switch 10b (i.e., the top-menu switch) is a switch for returning instantly to the image which is first displayed, whatever image is displayed. For example, it is a switch for returning to the image which indicates the highest layer on the hierarchical menu. Furthermore, the two switches 10a, 10b may also be disposed right and left, or slantwise.

In this way, while operating the hierarchical menu, even if an operator makes an operation error or does not see which operation it is, then continuously, when the operator wants to operate another function of the same equipment or operate different in-vehicle equipment, the operator can easily operate the input unit, using the switch 10a for returning one frame ahead on the hierarchical menu or the switch 10b for returning to the first image. This helps handle in-vehicle equipment simply.

In FIG. 5, the head-up display 4 includes a projection display 41, a storage section 42 and a control section 43. The left steering switch 8 and the right steering switch 10 are connected to the control section 43.

According to a control signal from the control section 43, the projection display 41 projects an image on the windshield 2 to display the virtual image. The storage section 42 stores in advance, for example, the configuration of a hierarchical menu shown in FIG. 6, or display images shown in FIG. 7A to FIG. 7E. It is configured, for example, by a non-volatile ROM (or read only memory).

For example, the control section 43 is configured by: a CPU (or central processing unit) which executes a predetermined arithmetic processing; a non-volatile ROM in which a predetermined control program is recorded; a RAM (or random access memory) which stores data temporarily; their peripheral circuits; and the like. In response to an operation instruction accepted by the left steering switch 8 and the right steering switch 10, the control section 43 allows the projection display 41 to display various display images, for example, according to the hierarchical-menu configuration stored in the storage section 42.

Figure 7A:
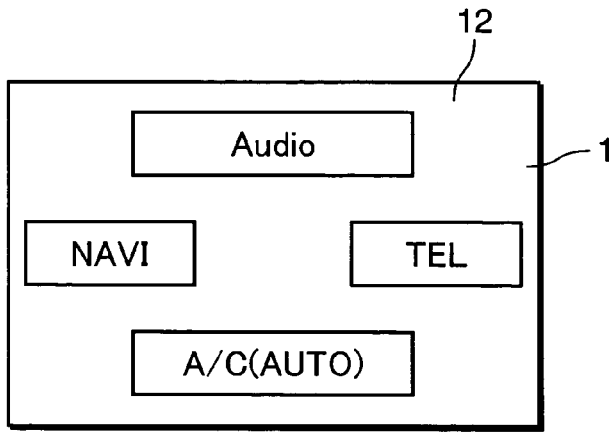
FIGS. 7A to 7E are diagrams, showing an example of the image of the hierarchical menu according to the first embodiment of the present invention.
Figure 7B:
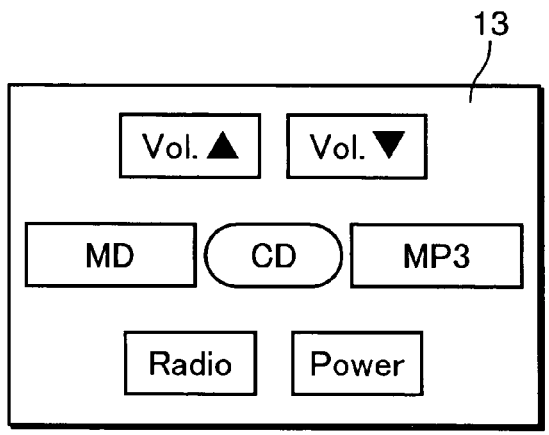
Figure 7C:
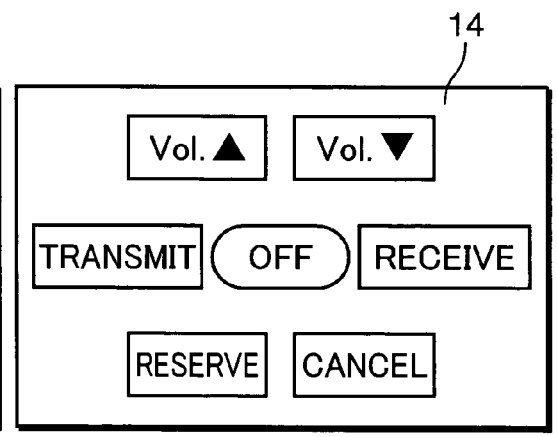
Figure 7D:
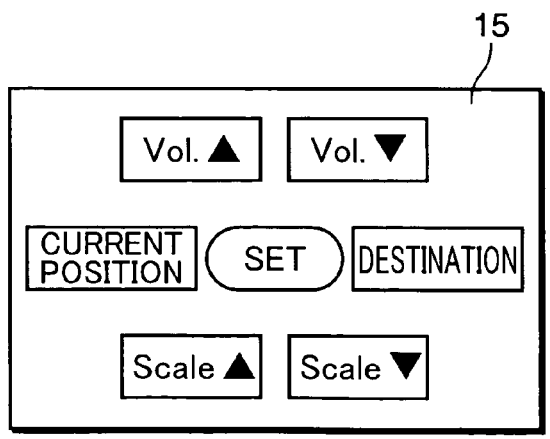

In FIG. 6 and FIGS. 7A to 7E, the virtual display image 1 for operating the plurality of pieces of in-vehicle equipment has a hierarchical-menu configuration which is composed of function selection items and function-adjustment selection items for each piece of in-vehicle equipment. If the driver 5 operates the steering switches disposed in the steering wheel 3, the head-up display 4 displays, as shown in FIG. 7A, the virtual display image 1 of a top menu 12 which is the top layer made up of selection items for in-vehicle equipment to be operated. The selection-item arrangement of this virtual display image 1 corresponds one to one to the arrangement of the plurality of switches of the left steering switch 8 disposed in the steering wheel. The left steering switch 8 is configured so that six switches adjoin and surround the central switch 8e. It has seven switches in total, and thus, seven virtual-image selection items can be displayed at the maximum, which is equal to the total number of the switches of the left steering switch 8. In this embodiment, four pieces of in-vehicle equipment are mentioned which are an audio system, an air conditioner, a telephone and a car-navigation system. Hence, four selection items are displayed on the top menu 12 as the image for selecting in-vehicle equipment to be operated. If the audio system is selected, the top menu 12 is changed to an audio home 13; if the air conditioner is selected, the top menu 12 is changed to an air-conditioner home 16; if the telephone is selected, the top menu 12 is changed to an telephone home 14; and if the car-navigation system is selected, the top menu 12 is changed to a navigation home 15.

In this way, the plurality of switches of the left steering switch 8 are disposed so as to correspond one to one to selection items of the virtual display image 1. Thus, by viewing such a display image, the driver 5 can be intuitively aware of the position of the switch which corresponds to the selection item which the driver 5 wants to operate, like up and down, right and left, or slantwise, with respect to the center.

In the hierarchical-menu configuration of FIG. 6, a detailed menu is shown about the audio system and the air conditioner. In the same way as the audio system and the air conditioner, the hierarchical menu of the telephone or the car-navigation system is also made up of function selection items and function-adjustment selection items.

In addition, as this hierarchical menu, selection items may also be set for car-communication related equipment typically including telematics, or adaptive cruise control system, lane keeping support system, blind spot monitoring system or the like.

Next, an operation will be described for switching the air outlet of the air conditioner to feet and their vicinity only, using the input unit described so far.

Figure 7E:
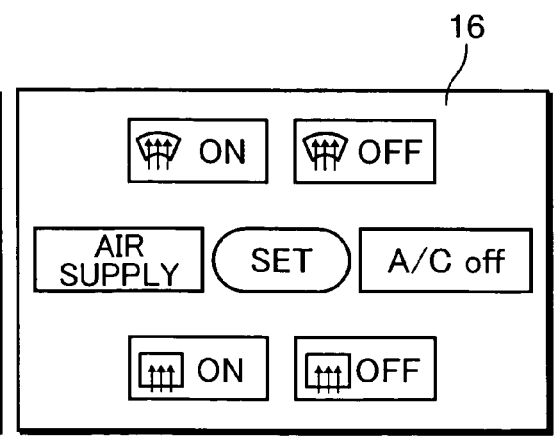

If the driver 5 operates either the left steering switch 8 or the right steering switch 10 disposed in the steering wheel 3, the head-up display 4 displays the virtual display image 1 within the front visual field. This virtual display image 1 is set to the top menu 12 as the first layer which is made up of four selection items for the audio system, the air conditioner, the telephone and the car-navigation system. The air conditioner's selection item is "A/C(AUTO)" which is located in the lower part of this image. In order to select this selection item, the driver 5 operates either the switch 8g or the switch 8h which is disposed in the lower part of the left steering switch 8. At the same time that the selection item is selected, it is determined by the input unit. As shown in FIG. 7E, the image is changed to the air-conditioner home 16 as the second layer which is made up of seven selection items of "windshield defrosting ON", "windshield defrosting OFF", "air supply", "setting", "A/C OFF", "rear-window defrosting ON", and "rear-window defrosting OFF".

Next, in order to select "setting" located at the center of the selection items in this air-conditioner home 16, the driver 5 operates the central switch 8e placed in the center of the left steering switch 8. Thereby, as shown in FIG. 8A, the head-up display 4 displays an image of a third layer which is made up of seven selection items of "Temp▲", "Temp▼", "FAN▲", "MODE", "FAN▼", "interior-air circulation", and "exterior-air circulation". The "MODE" for switching the air outlet of the air conditioner is located at the center. Hence, if the central switch 8e placed in the center of the left steering switch 8 is operated, then as shown in FIG. 8B, the image is changed to an image of a fourth layer which is made up of seven selection items of "the front only", "the front and feet", "feet only" and "feet and defrosting". Finally, the "feet only" lies in the lower part. Hence, if either the switch 8g or the switch 8h disposed in the lower part of the left steering switch 8 is operated, according to a control signal from the control section 43, the air conditioner (not shown) sets the air outlet to feet and their vicinity only.

If the driver 5 makes an operation error while operating the input unit, or continuously, if the driver 5 wants to operate another function of the equipment now in operation, the driver 5 operates the switch 10a disposed in the lower part of the right steering switch 10. Thereby, the head-up display 4 returns the image to the preceding one, so that the driver 5 can operate it again. In addition, if the driver 5 wants to start again from the selection of in-vehicle equipment, or sequentially, if the driver 5 wants to operate different in-vehicle equipment, the driver 5 operates the switch 10b disposed in the upper part of the right steering switch 10. Thereby, the top menu 12 is called so that the driver 5 can operate it.

In this in-vehicle input unit, a hierarchical menu is used to operate a plurality of pieces of in-vehicle equipment. Hence, an operator may feel troublesome, compared with the case where several limited functions of an audio system and the like can be directly operated using a steering switch assembled into a vehicle which is currently mass-produced. Thus, the changing switch 8a is disposed in the left steering spoke 9, so that functions operated very frequently can be directly operated without using the hierarchical menu. If this changing switch 8a is operated, then as shown in FIG. 9, the virtual display image 1 displayed in the front field of vision turns into an image indicating the default operation menu which is made up of seven selection items of "Vol▲" and "Vol▼" for adjusting the sound volume of an audio apparatus, "Skip▲" and "Skip▼" for selecting a broadcasting station in a radio receiver, "MODE" for selecting, as the audio source, one of a plurality of kinds of audio apparatus, such as a TAPE (or a cassette tape player), a CD (or a Compact Disc player), an MD (or a Mini Disc player) and the radio receiver, "A/C ON" for turning on the power of the air conditioner, and "the current position" for announcing the present place in the car-navigation system. For example, if an operator wants to turn up the sound volume of the audio apparatus, the operator operates the switch 8b of the left steering switch 8 because the "Vol▲" as the corresponding volume-adjustment selection item is located at the upper left of the display image. Thereby, the sound volume can be heightened without using the hierarchical menu. This helps lighten a burdensome operation for equipment which is operated very frequently, as well as operate such equipment directly.

Furthermore, the changing switch 8a has a different shape from the plurality of switches 8b to 8h. Hence, without checking them with the eyes and simply by touching them with some finger, an operator can distinguish the changing switch 8a for displaying the default operation menu from the plurality of switches 8b to 8h for selecting a selection item. This makes it easier to operate the input unit.

Moreover, the number of directly-operable selection items can be set at seven, which correspond to the seven switches in the left steering switch 8. Thus, function-adjustment selection items other than those of the above described example may also be set.

Second Embodiment

Figure 10A:
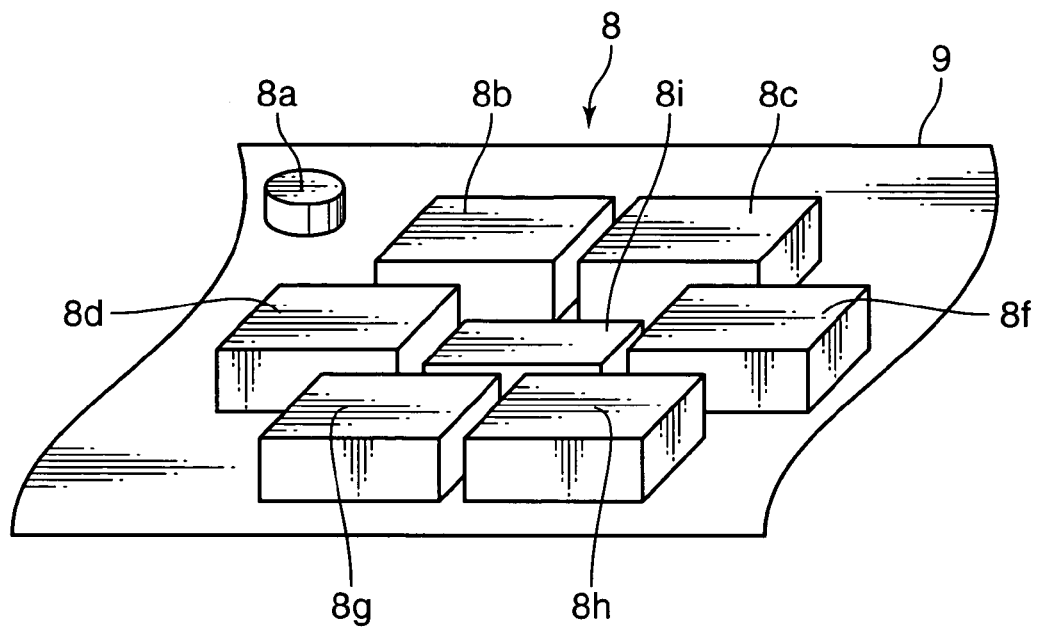
FIGS. 10A and 10B are enlarged perspective views of a switch portion provided in the steering spoke on the left side if seen from the driver's seat according to a second embodiment of the present invention.
Figure 10B:
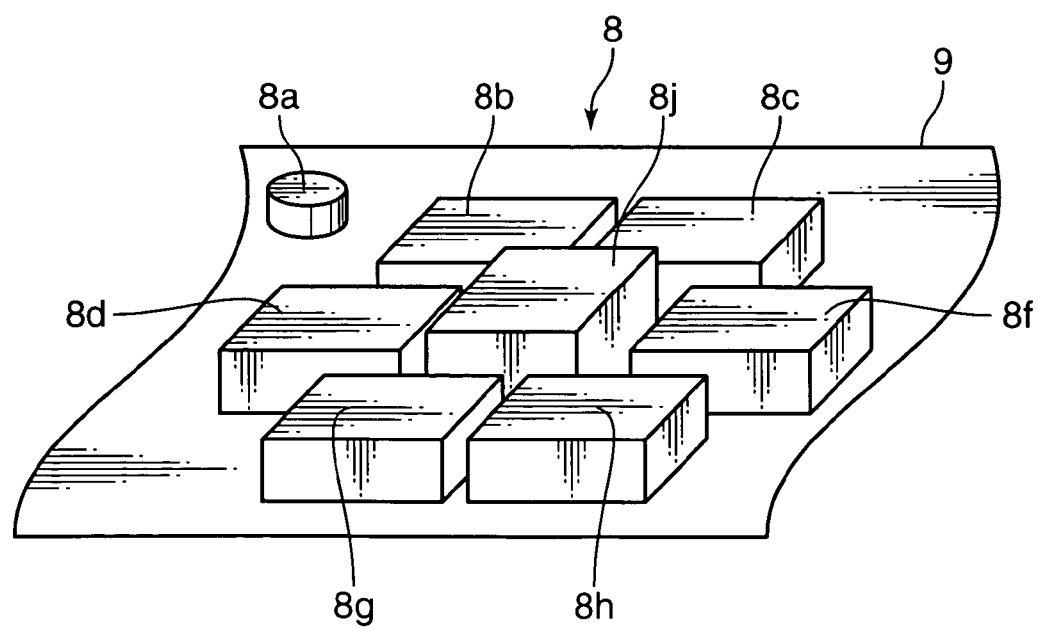
Figure 11A:
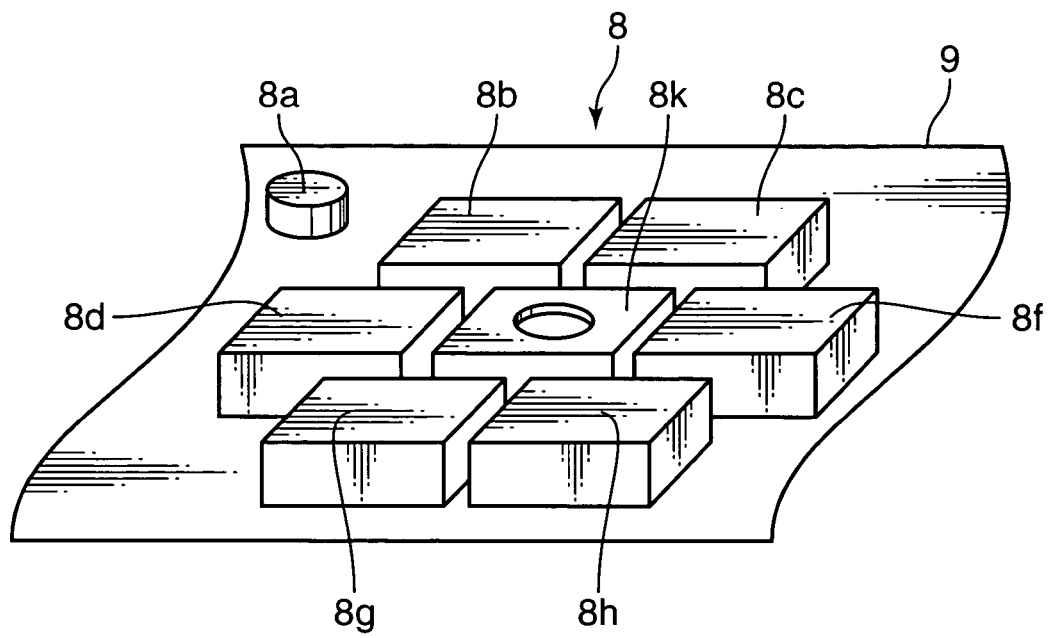
FIGS. 11A and 11B are enlarged perspective views of a switch portion provided in the steering spoke on the left side if seen from the driver's seat according to the second embodiment of the present invention.
Figure 11B:
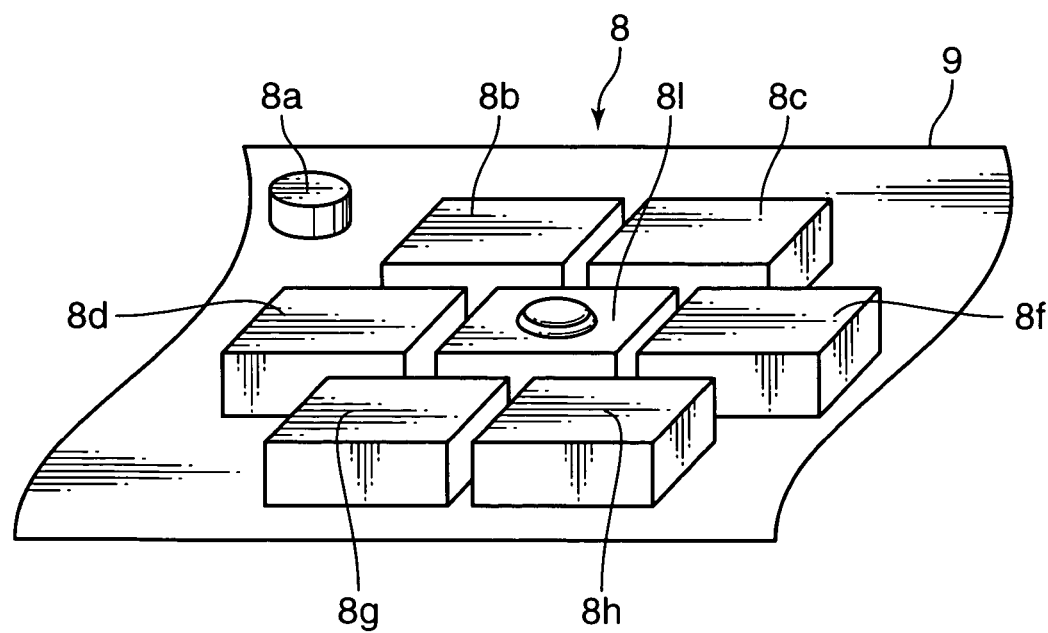
Figure 12B:
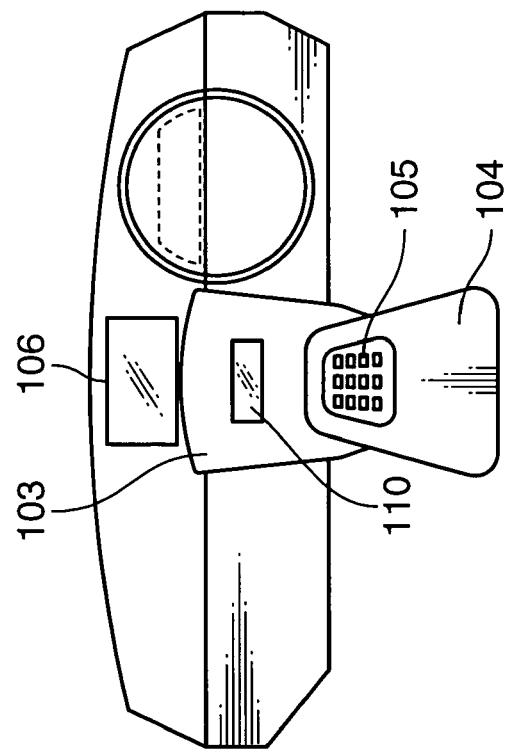
FIGS. 12A and 12B are views of an input unit for in-vehicle equipment according to a prior art, showing its arrangement.
Figure 12A:
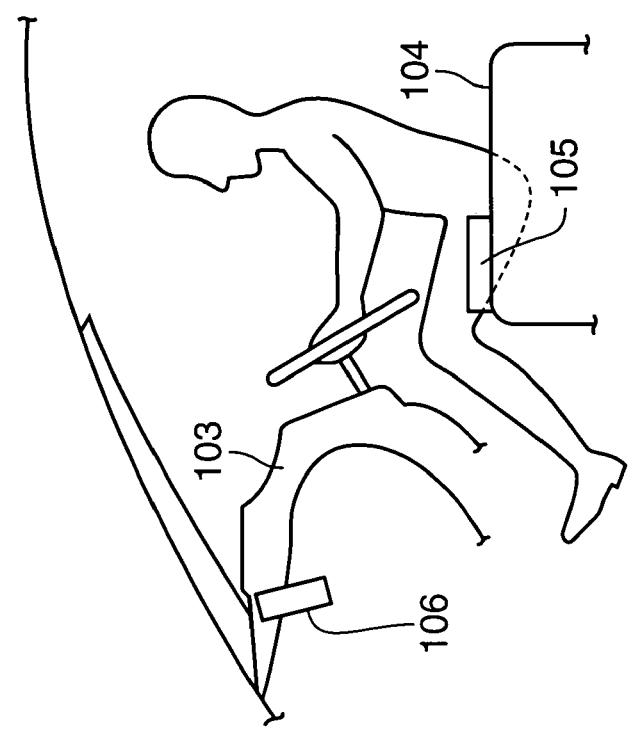
Figure 13C:
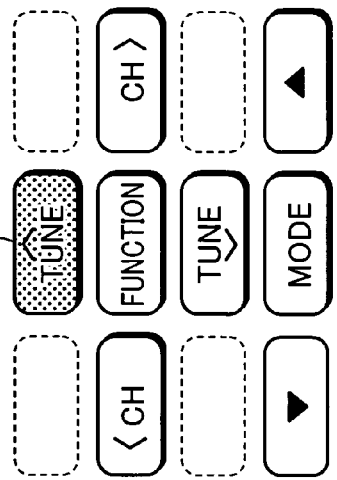
FIGS. 13A to 13D are diagrams, showing a hierarchical menu displayed in an interior display according to the prior art.
Figure 13D:
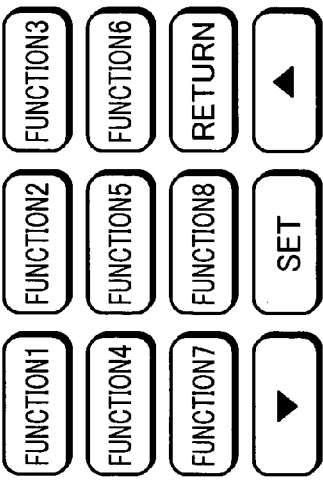
Figure 13A:
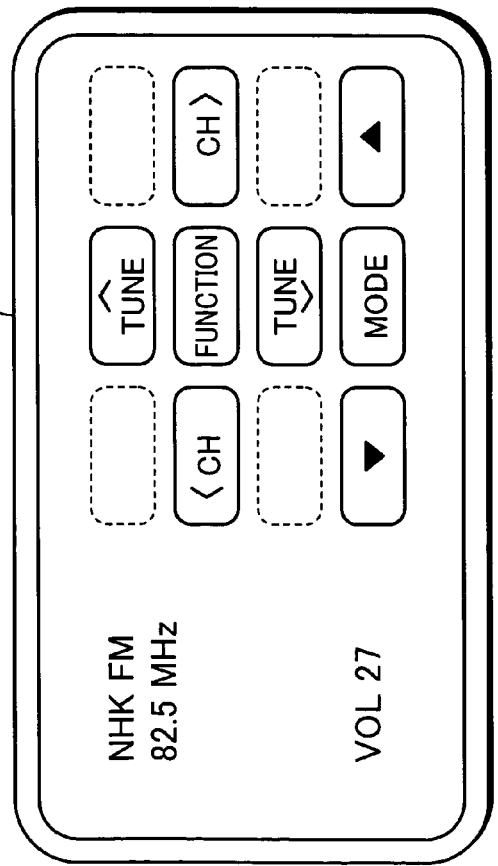
Figure 13B:
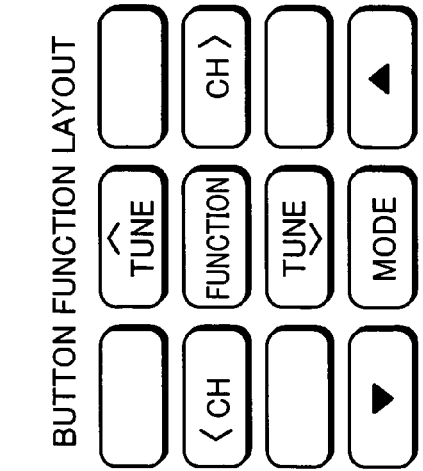

Hereinafter, the present invention will be described using its second embodiment. FIG. 10A and FIG. 10B are each an enlarged perspective view of an example of a switch portion provided in a steering spoke on the left side if seen from a driver's seat according to the second embodiment of the present invention. FIG. 11A and FIG. 11B are each an enlarged perspective view of another example of a switch portion provided in the steering spoke on the left side if seen from the driver's seat according to the second embodiment of the present invention.

In FIG. 10A, FIG. 10B and FIG. 11A, FIG. 11B, input switches for operating the plurality of pieces of in-vehicle equipment are the left steering switch 8 and a changing switch 8a which are provided in a left steering spoke 9. The left steering switch 8 is configured so that a switch 8b, a switch 8c, a switch 8d, a switch 8f, a switch 8g, a switch 8h adjoin and surround each central switch 8i, 8j, 8k, 8l. In a position apart from this left steering switch 8, the changing switch 8a is disposed.

The central switches 8i, 8j, 8k, 8l shown in FIG. 10A, FIG. 10B, FIG. 11A and FIG. 11B each has a different shape from the switch 8b, the switch 8c, the switch 8d, the switch 8f, the switch 8g, the switch 8h which adjoin and surround each of the central switches.

The central switch 8i shown in FIG. 10A is lower than the switch 8b, the switch 8c, the switch 8d, the switch 8f, the switch 8g, the switch 8h which adjoin and surround the central switch. In contrast, the central switch 8j shown in FIG. 10B is higher than the switch 8b, the switch 8c, the switch 8d, the switch 8f, the switch 8g, the switch 8h which adjoin and surround each of them. The surface of the central switch 8k shown in FIG. 11A is partly processed in a concave shape while the surface of the central switch 8l shown in FIG. 11B is partly processed in a convex shape.

As long as the left steering switch 8 is disposed so that several switches adjoin and surround each central switch 8i, 8j, 8k, 8l, they may also be located up-and-down or right-and-left, or up-and-down or right-and-left obliquely in either case, with respect to each central switch 8i, 8j, 8k, 8l. Additionally, such a central switch itself may also have a different shape from the several switches which adjoin and surround it. For example, the central switch can also be shaped like a column.

In this way, the central switches 8i, 8j, 8k, 8l differ in height from the several switches which adjoin and surround them. Or, the former differ in shape from the latter, because the central switches 8i, 8j, 8k, 8l have a concave portion or a convex portion in their surfaces. This makes it easier for the driver 5 to distinguish between the central switches 8i, 8j, 8k, 8l in the position where the driver 5 usually places some finger and the several switches which adjoin and surround those switches. Therefore, the driver 5 can move the finger from this fixed central position to the targeted switch, through a simple up-and-down, right-and-left, or slant motion. In addition, the driver 5 can operate the targeted switch without looking at it, thus keeping one's eyes within the front field of vision. This makes it possible to restrain a heavy burden from being imposed on the eyes.

Additionally, similarly to the first embodiment, the in-vehicle input unit executes the same operation, even though the shape of each central switch in the input switch is different. Hence, each central switch can be more easily distinguished from switches which adjoin and surround them. This presents the same advantages as those of the first embodiment.

As described so far, the in-vehicle input unit according to the present invention, comprises: a head-up display which projects a hierarchical menu for operating a plurality of pieces of in-vehicle equipment onto a windshield in front of a driver's seat, and displays the hierarchical menu as a virtual image ahead of the windshield; and a plurality of switches which are disposed in a steering wheel so that several switches adjoin and surround one central switch, wherein the head-up display displays selection items on the hierarchical menu as the virtual image so that the selection items correspond one to one to the plurality of switches disposed in the steering wheel.

According to this configuration, an input system is designed so that using a head-up display, while viewing a virtual image displayed ahead of a windshield in front of a driver's seat, the driver manipulates switches disposed in a steering wheel. Therefore, the driver can operate the switches without letting go of the steering wheel and without turning one's eyes away from the front visibility. Furthermore, the arrangement of the plurality of switches disposed in the steering wheel corresponds one to one to the arrangement of selection items on a hierarchical menu of the displayed virtual image. Then, the plurality of switches are disposed so that several switches adjoin and surround one central switch, and this single central switch lies in the position where the fingers of an operator are always laid. Therefore, without turning one's eyes to the plurality of switches while viewing the image displayed ahead of the driver's seat, the driver can easily operate the switches intuitively with respect to the position of the central switch. This helps the driver run the vehicle more safely. Moreover, without turning one's eyes on the switches from ahead of the driver's seat, the driver can manipulate the switches. This makes it possible to reduce the change in the focal point of the driver's eyes when operating the switches, so that the driver can operate them without imposing a heavy burden on the eyes.

Furthermore, it is preferable that the central switch be different in height from the other adjoining and surrounding switches.

According to this configuration, an operator can more easily distinguish between a single central switch in the position where the operator always puts some finger and other switches which adjoin and surround this. This makes it possible to more simply operate those switches without looking at the switches.

Moreover, the central switch may also be designed to have a concave portion or a convex portion.

According to this configuration, an operator can distinguish more easily between a single central switch in the position where the operator always puts some finger and other switches which adjoin and surround this switch. This makes it possible to more simply operate those switches without looking at the switches.

Furthermore, preferably, a changing switch should be further provided which is disposed in the steering wheel and accepts a default instruction for displaying on the head-up display, a default operation menu having default selection items for operating the in-vehicle equipment directly without using the hierarchical menu; and if the changing switch accepts the default instruction, the head-up display should display the default selection items on the default operation menu as the virtual image so that the default selection items correspond one to one to the plurality of switches.

According to this configuration, using a changing switch provided in a position apart from a plurality of switches disposed so that several switches adjoin and surround a single central switch which is provided in a steering wheel, the function of specific equipment can be directly operated without using a hierarchical menu. This makes it easier to operate the specific equipment.

Furthermore, preferably, a top-menu switch should be further provided which accepts a top-menu instruction for displaying the top layer of the hierarchical menu; and if the top-menu switch accepts the top-menu instruction, the head-up display should display the top layer of the hierarchical menu as the virtual image.

According to this configuration, if the top-menu switch accepts the top-menu instruction, then regardless of a displayed layer of the hierarchical menu, the top layer of the hierarchical menu is displayed as the virtual image. This makes it easier for an operator to execute an operation again from the top layer of the hierarchical menu.

Furthermore, it is preferable that the steering wheel include two spokes; the plurality of switches disposed in one of the spokes; and the top-menu switch disposed in the other of the spokes.

According to this configuration, an operator can operate the plurality of switches with one hand to select a selection item on the hierarchical menu, while the operator can operate the top-menu switch with the other hand to allow the head-up display to display the top layer of the hierarchical menu as the virtual image. Therefore, an operation for selecting a selection item and an operation for displaying the top layer can be executed with different hands from each other. This makes it easier to execute an operation.

Furthermore, preferably, a return switch should be further provided which accepts a return instruction for displaying a virtual image displayed one frame ahead by the head-up display; and if the return switch accepts the return instruction, the head-up display should display the virtual image displayed one frame ahead.

According to this configuration, if the return switch accepts the return instruction, the preceding virtual image is displayed by the head-up display. Therefore, using the return switch, an operator can execute the preceding operation again. This makes it easier to execute an operation.

Furthermore, it is preferable that the steering wheel include two spokes; the plurality of switches disposed in one of the spokes; and the return switch disposed in the other of the spokes.

According to this configuration, an operator can operate the plurality of switches with one hand to select a selection item on the hierarchical menu, while the operator can operate the return switch with the other hand to allow the head-up display to display the preceding virtual image. Therefore, an operation for selecting a selection item and an operation for displaying the preceding virtual image displayed on the head-up display can be executed with different hands from each other. This makes it easier to execute an operation.

Furthermore, it is preferable that the spokes each be disposed in the horizontal direction of the steering wheel when the vehicle is running straight.

According to this configuration, when the steering wheel is positioned so that the vehicle runs straight, two spokes are provided in the position where an operator can grasp the steering wheel easily with both hands. Therefore, using both hands, the operator can operate switches provided in the two spokes.

Furthermore, it is preferable that one of the spokes be disposed on the left hand of the steering wheel, and the other of the spokes be disposed on the right hand of the steering wheel.

According to this configuration, when the steering wheel is positioned so that the vehicle runs straight, a plurality of switches for executing an operation for selecting a selection item is provided in the position where an operator can grasp the steering wheel easily with the left hand. On the other hand, a switch for changing the display image on the hierarchical menu is provided in the position where the operator can grasp it easily with the right hand. Therefore, first, the operator can roughly change the contents which the operator wants to operate with the right hand. Then, the operator can execute an operation for selecting a detailed selection item with the left hand. This makes it easier to execute an operation intuitively.

Furthermore, it is preferable that in the top layer of the hierarchical menu, the plurality of pieces of in-vehicle equipment be set as selection items.

According to this configuration, first of all, an operator selects in-vehicle equipment which the operator wants to operate. This makes it easy to select the targeted in-vehicle equipment.

Furthermore, it is preferable that the plurality of pieces of in-vehicle equipment include an audio apparatus; and the default operation menu include a selection item for accepting an instruction to increase the sound volume of the audio apparatus, and a selection item for accepting an instruction to decrease the sound volume of the audio apparatus.

According to this configuration, an operator operates the changing switch and allows the head-up display to display the default operation menu. Therefore, an operation for increasing the sound volume of the audio apparatus and an operation for decreasing the sound volume of the audio apparatus which are very frequently executed can be directly executed. This makes it easier to execute an operation.

Furthermore, it is preferable that the audio apparatus be a radio receiver; and the default operation menu further include a selection item for accepting an instruction to select a broadcasting station.

According to this configuration, an operator operates the changing switch and allows the head-up display to display the default operation menu. Therefore, an operation for selecting a broadcasting station which is very frequently executed can be directly executed. This makes it easier to execute an operation.

In addition, the plurality of pieces of in-vehicle equipment may include a plurality of kinds of audio apparatuses; and the default operation menu can include selection items for accepting an instruction to select one from the plurality of kinds of audio apparatuses.

According to this configuration, an operator operates the changing switch and allows the head-up display to display the default operation menu. Therefore, an operation for selecting one from the plurality of kinds of audio apparatuses which is very frequently executed can be directly executed. This makes it easier to execute an operation.

In addition, the plurality of pieces of in-vehicle equipment may include an air-conditioning apparatus; and the default operation menu can include selection items for turning on the power of the air-conditioning apparatus.

According to this configuration, an operator operates the changing switch and allows the head-up display to display the default operation menu. Therefore, an operation for turning on the power of the air-conditioning apparatus which is very frequently executed can be directly executed. This makes it easier to execute an operation.

In addition, the plurality of pieces of in-vehicle equipment may include a car-navigation apparatus; and the default operation menu can include a selection item for allowing the car-navigation apparatus to give information about where a vehicle is located at present.

According to this configuration, an operator operates the changing switch and allows the head-up display to display the default operation menu. Therefore, an operation for allowing the car-navigation apparatus to give information about where a vehicle is currently located which is very frequently executed can be directly executed. This makes it easier to execute an operation.

Furthermore, it is preferable that the plurality of switches be disposed so that six switches adjoin and surround the central switch.

If too many switches surround the central switch, an operator tends to press a wrong switch, thereby making it difficult to execute an operation. In contrast, the number of switches which surround the central switch is too small, the number of selection items per layer on the hierarchical menu is reduced, thus making it hard to execute an operation. Hence, if the number of switches which surround the central switch is set at six, the balance of the tendency to press a wrong switch and the number of selection items per layer can be properly kept. This makes it easier to execute an operation.

Furthermore, it is preferable that as the plurality of switches, two on the forward side, two on the backward side, one on the left side and one on the right side from the central switch be disposed when the steering wheel is positioned so that the vehicle runs straight.

According to this configuration, when the steering wheel is positioned so that the vehicle runs straight, in order from the forward side; first, two switches are lined; three switches are lined in the next row; and in its following row, two switches are lined. Hence, the number of switches in each row is different from that of their adjacent row, thus making it easy to distinguish between them according to the sense of touch.

Furthermore, it is preferable that the plurality of switches be different in shape from the changing switch.

According to this configuration, an operator can distinguish between the plurality of switches for executing a selection-item selecting operation and the changing switch for displaying the default operation menu, without checking them with the eyes and simply by touching them with some finger. This makes it easier to execute an operation.

This application is based on Japanese patent application serial No. 2005-140917, filed in Japan Patent Office on May 13, 2005, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An in-vehicle input unit, comprising:
a head-up display which projects a hierarchical menu for operating a plurality of pieces of in-vehicle equipment onto a windshield in front of a driver's seat, and displays the hierarchical menu as a virtual image ahead of the windshield;
a plurality of switches disposed in a steering wheel so that several switches adjoin and surround one central switch; and
a changing switch which is disposed in the steering wheel and accepts a default instruction for displaying on the head-up display a default operation menu having default selection items for operating the in-vehicle equipment directly without using the hierarchical menu,
wherein the head-up display displays selection items on the hierarchical menu as the virtual image so that the selection items correspond one to one to the plurality of switches disposed in the steering wheel; and
if the changing switch accepts the default instruction, the head-up display displays the default selection items on the default operation menu as the virtual image so that the default selection items correspond one to one to the plurality of switches.

2. The in-vehicle input unit according to claim 1, wherein the central switch is different in height from the other adjoining and surrounding switches.

3. The in-vehicle input unit according to claim 1, wherein the central switch has a concave portion or a convex portion.

4. The in-vehicle input unit according to claim 1, wherein in the top layer of the hierarchical menu, the plurality of pieces of in-vehicle equipment are set as selection items.

5. The in-vehicle input unit according to claim 1, wherein:
the plurality of pieces of in-vehicle equipment include an audio apparatus; and
the default operation menu includes a selection item for accepting an instruction to increase the sound volume of the audio apparatus, and a selection item for accepting an instruction to decrease the sound volume of the audio apparatus.

6. The in-vehicle input unit according to claim 5, wherein:
the audio apparatus is a radio receiver; and the default operation menu further includes a selection item for accepting an instruction to select a broadcasting station.

7. The in-vehicle input unit according to claim 1, wherein:
the plurality of pieces of in-vehicle equipment include a plurality of kinds of audio apparatuses; and
the default operation menu includes selection items for accepting an instruction to select one from the plurality of kinds of audio apparatuses.

8. The in-vehicle input unit according to claim 1, wherein:
the plurality of pieces of in-vehicle equipment include an air-conditioning apparatus; and
the default operation menu includes selection items for turning on the power of the air-conditioning apparatus.

9. The in-vehicle input unit according to claim 1, wherein:
the plurality of pieces of in-vehicle equipment include a car-navigation apparatus; and
the default operation menu includes a selection item for allowing the car-navigation apparatus to give information about where a vehicle is located at present.

10. The in-vehicle input unit according to claim 1, wherein the plurality of switches are disposed so that six switches adjoin and surround the central switch.

11. The in-vehicle input unit according to claim 10, wherein as the plurality of switches, two on the forward side, two on the backward side, one on the left side and one on the right side from the central switch are disposed when the steering wheel is positioned so that the vehicle runs straight.

12. The in-vehicle input unit according to claim 1, wherein the plurality of switches are different in shape from the changing switch.

13. An in-vehicle input unit, comprising:
a head-up display which projects a hierarchical menu for operating a plurality of pieces of in-vehicle equipment onto a windshield in front of a driver's seat, and displays the hierarchical menu as a virtual image ahead of the windshield;
a plurality of switches disposed in a steering wheel so that several switches adjoin and surround one central switch; and
a top-menu switch which accepts a top-menu instruction for displaying the top layer of the hierarchical menu,
wherein the head-up display displays selection items on the hierarchical menu as the virtual image so that the selection items correspond one to one to the plurality of switches disposed in the steering wheel; and
if the top-menu switch accepts the top-menu instruction, the head-up display displays the top layer of the hierarchical menu as the virtual image.

14. The in-vehicle input unit according to claim 13, wherein:
the steering wheel includes two spokes;
the plurality of switches are disposed in one of the spokes; and
the top-menu switch is disposed in the other of the spokes.

15. The in-vehicle input unit according to claim 14, wherein the spokes are disposed in the horizontal direction of the steering wheel positioned so that a vehicle runs straight.

16. The in-vehicle input unit according to claim 15, wherein:
one of the spokes is disposed on the left hand of the steering wheel; and
the other spoke is disposed on the right direction of the steering wheel.

17. The in-vehicle input unit according to claim 13, wherein the central switch is different in height from the other adjoining and surrounding switches.

18. The in-vehicle input unit according to claim 13, wherein the central switch has a concave portion or a convex portion.

19. The in-vehicle input unit according to claim 13, wherein in the top layer of the hierarchical menu, the plurality of pieces of in-vehicle equipment are set as selection items.

20. The in-vehicle input unit according to claim 13, wherein the plurality of switches are disposed so that six switches adjoin and surround the central switch.

21. An in-vehicle input unit, comprising:
a head-up display which projects a hierarchical menu for operating a plurality of pieces of in-vehicle equipment onto a windshield in front of a driver's seat, and displays the hierarchical menu as a virtual image ahead of the windshield;
a plurality of switches disposed in a steering wheel so that several switches adjoin and surround one central switch; and
a return switch which accepts a return instruction for displaying a virtual image displayed one frame ahead by the head-up display,
wherein the head-up display displays selection items on the hierarchical menu as the virtual image so that the selection items correspond one to one to the plurality of switches disposed in the steering wheel; and
if the return switch accepts the return instruction, the head-up display displays the virtual image displayed one frame ahead.

22. The in-vehicle input unit according to claim 21, wherein:
the steering wheel includes two spokes;
the plurality of switches are disposed in one of the spokes; and
the return switch is disposed in the other of the spokes.

23. The in-vehicle input unit according to claim 21, wherein the central switch is different in height from the other adjoining and surrounding switches.

24. The in-vehicle input unit according to claim 21, wherein the central switch has a concave portion or a convex portion.

25. The in-vehicle input unit according to claim 21, wherein in the top layer of the hierarchical menu, the plurality of pieces of in-vehicle equipment are set as selection items.

26. The in-vehicle input unit according to claim 21, wherein the plurality of switches are disposed so that six switches adjoin and surround the central switch.

* * * * *